United States Patent

Egawa

(10) Patent No.: US 10,767,043 B2
(45) Date of Patent: Sep. 8, 2020

(54) AROMATIC POLYCARBONATE RESIN COMPOSITION AND MOLDED ARTICLE OF THE SAME

(71) Applicant: Mitsubishi Engineering-Plastics Corporation, Minato-ku (JP)

(72) Inventor: Makoto Egawa, Hiratsuka (JP)

(73) Assignee: Mitsubishi Enigineering-Plastics Corporation, Minato-ku (JP)

( * ) Notice: Subject to any disclaimer, the term of this patent is extended or adjusted under 35 U.S.C. 154(b) by 106 days.

(21) Appl. No.: 15/758,011

(22) PCT Filed: Sep. 27, 2016

(86) PCT No.: PCT/JP2016/078371
§ 371 (c)(1),
(2) Date: Mar. 7, 2018

(87) PCT Pub. No.: WO2017/090310
PCT Pub. Date: Jun. 1, 2017

(65) Prior Publication Data
US 2018/0201782 A1 Jul. 19, 2018

(30) Foreign Application Priority Data

Nov. 27, 2015 (JP) ................................. 2015-231998
Sep. 8, 2016 (JP) ................................. 2016-175695

(51) Int. Cl.
C08K 5/053 (2006.01)
C08K 5/1515 (2006.01)
C08K 5/49 (2006.01)
C08K 5/52 (2006.01)
C08L 69/00 (2006.01)
G02B 6/24 (2006.01)
G02B 6/42 (2006.01)
G02B 1/04 (2006.01)
F21V 8/00 (2006.01)
B60Q 1/04 (2006.01)
F21S 43/235 (2018.01)

(52) U.S. Cl.
CPC .............. *C08L 69/00* (2013.01); *G02B 1/045* (2013.01); *B60Q 1/04* (2013.01); *B60Q 2400/30* (2013.01); *C08K 2201/014* (2013.01); *C08L 2201/08* (2013.01); *C08L 2203/20* (2013.01); *F21S 43/235* (2018.01); *G02B 6/0001* (2013.01); *G02B 6/0065* (2013.01)

(58) Field of Classification Search
USPC .................. 524/114, 117, 120, 128, 386, 537
See application file for complete search history.

(56) References Cited

U.S. PATENT DOCUMENTS

| 2,796,404 | A | * | 6/1957 | Levin | ................... C07D 277/20 |
| | | | | | 508/271 |
| 4,739,000 | A | * | 4/1988 | Burton | ................... C08K 5/524 |
| | | | | | 524/128 |
| 5,962,379 | A | * | 10/1999 | Carey | ..................... C10L 1/221 |
| | | | | | 508/464 |
| 9,593,202 | B2 | * | 3/2017 | Okamoto | .................. B29B 9/12 |
| 2014/0350148 | A1 | | 11/2014 | Takimoto et al. | |
| 2016/0122533 | A1 | | 5/2016 | Tomita et al. | |

FOREIGN PATENT DOCUMENTS

| CN | 104023928 A | 9/2014 |
| EP | 2 792 711 A1 | 10/2014 |
| JP | 2004-051700 A | 2/2004 |
| JP | 2007-204737 A | 8/2007 |
| JP | 2009-013393 A | 1/2009 |
| JP | 2013-234233 A | 11/2013 |
| JP | 2015-025068 A | 2/2015 |
| JP | 2015-189879 A | 11/2015 |
| JP | 2016-121205 A | 7/2016 |
| WO | 2008/149579 A1 | 12/2008 |
| WO | WO 2015/011994 A1 | 1/2015 |
| WO | 2016/125625 A1 | 8/2016 |

OTHER PUBLICATIONS

Extended European Search Report dated Oct. 26, 2018 in European Patent Application No. 16868259.9, 10 pages.

(Continued)

*Primary Examiner* — Tae H Yoon
(74) *Attorney, Agent, or Firm* — Oblon, McClelland, Maier & Neustadt, L.L.P.

(57) ABSTRACT

Provided is an aromatic polycarbonate resin composition that is excellent in terms of hue and thermal yellowing-inhibiting effect and is suitable for light guide members incorporated in automobile lighting devices. The aromatic polycarbonate resin composition comprises: 100 parts by mass of an aromatic polycarbonate resin (A); 0.001 to 0.1 parts by mass of a phosphite stabilizer (B-I) as a phosphorus-based stabilizer (B) having a spiro ring skeleton; 0.01 to 0.5 parts by mass of a phosphite stabilizer (B-II) as a phosphorus-based stabilizer (B) represented by general formula (II) below; 0.05 to 2 parts by mass of a polybutylene glycol compound (C); and 0.0005 to 0.2 parts by mass of an epoxy compound (D).

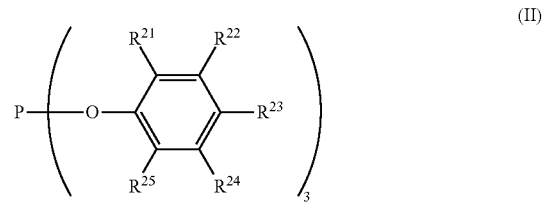

(II)

In the formula (II), $R^{21}$ to $R^{25}$ each independently represent a hydrogen atom, an aryl group having 6 to 20 carbon atoms, or an alkyl group having 1 to 20 carbon atoms.

8 Claims, No Drawings

(56) References Cited

OTHER PUBLICATIONS

International Search Report dated Jan. 10, 2017 in PCT/JP2016/078371, filed on Sep. 27, 2016.
Combined Office Action and Search Report dated Jul. 19, 2019 in Chinese Patent Application No. 201680050921.6 (with English translation of category of cited documents), 9 pages.
Chinese Office Action dated Mar. 17, 2020 in Chinese Patent Application No. 201680050921.6, 4 pages.

* cited by examiner

AROMATIC POLYCARBONATE RESIN COMPOSITION AND MOLDED ARTICLE OF THE SAME

CROSS REFERENCE TO RELATED APPLICATIONS

The present application is a 35 U.S.C. § 371 national stage patent application of International patent application PCT/JP2016/078371, filed on Sep. 27, 2016, the text of which is incorporated by reference, and claims the benefit of the filing date of Japanese patent applications JP 2016-175695, filed on Sep. 8, 2016, and JP 2015-231998, filed on Nov. 27, 2015, the texts of which are also incorporated by reference.

TECHNICAL FIELD

The present invention relates to an aromatic polycarbonate resin composition and a molded article of the aromatic polycarbonate resin composition. Specifically, the present invention relates to an aromatic polycarbonate resin composition that is suitable as a molding material for light guide members and that is excellent in terms of hue and thermal discoloration-inhibiting effect and to a molded article obtained by molding the aromatic polycarbonate resin composition.

BACKGROUND ART

In recent years, for example, in Europe and North America, installation of daytime running lights, which are being switched on all the time, in automobile head lamps and rear lamps has been promoted to increase the conspicuity from pedestrians and cars in the opposite lane during the daytime. Such daytime running lights generally include a light guide member and a light source that emits light incident on the light guide member. In general, incandescent lamps such as halogen lamps are disposed as typical light sources for the nighttime near the daytime running lights of automobiles. The light guide member is heated by heat generated from the light sources of the daytime running lights and heat generated from the incandescent lamps. Therefore, the light guide member needs to have excellent thermal resistance.

For example, PTL 1 discloses, as a material for light guide members, an aromatic polycarbonate resin composition obtained by adding a phosphorus-based stabilizer and a fatty acid ester to an aromatic polycarbonate resin. When a known aromatic polycarbonate resin composition is molded to produce a light guide member for automobile lighting devices, the aromatic polycarbonate resin deteriorates because of heat during the molding process and the produced molded article may have a slight tinge of yellow. Furthermore, even if the light guide member does not have a tinge of yellow during the molding, the light guide member deteriorates and turns yellow by being exposed to heat from a light source around the light guide member for a long time.

PTL 2 discloses an aromatic polycarbonate resin composition that improves yellowing resistance and inhibits yellowing even when exposed under heating conditions for a long time. The aromatic polycarbonate resin composition is obtained by adding two phosphite stabilizers and a fatty acid ester to an aromatic polycarbonate resin.

PTL 1: Japanese Patent Publication 2007-204737 A
PTL 2: Japanese Patent Publication 2015-189879 A Light guide members incorporated in automobile lighting devices are desirably formed of a material that has a better hue and thermal yellowing-inhibiting effect than known aromatic polycarbonate resin compositions.

SUMMARY OF INVENTION

It is an object of the present invention to provide an aromatic polycarbonate resin composition that is excellent in terms of hue and thermal yellowing-inhibiting effect and is suitable for light guide members incorporated in automobile lighting devices. It is also an object of the present invention to provide a molded article obtained by molding the aromatic polycarbonate resin composition.

The present inventors have found that the above problem can be solved by adding a polybutylene glycol compound and an epoxy compound together with two particular phosphite stabilizers.

The gist of the present invention is as follows.
[1] An aromatic polycarbonate resin composition comprising:
  100 parts by mass of an aromatic polycarbonate resin (A);
  0.001 to 0.1 parts by mass of a phosphite stabilizer (B-I) as a phosphorus-based stabilizer (B) having a spiro ring skeleton;
  0.01 to 0.5 parts by mass of a phosphite stabilizer (B-II) as a phosphorus-based stabilizer (B) represented by general formula (II) below;
  0.05 to 2 parts by mass of a polybutylene glycol compound (C); and
  0.0005 to 0.2 parts by mass of an epoxy compound (D),

[Chem. 1]

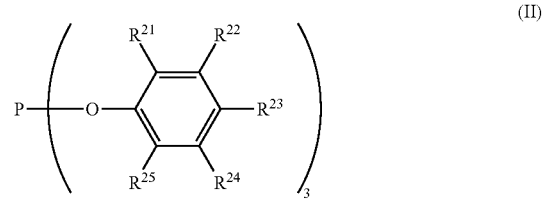

In the formula (II), $R^{21}$ to $R^{25}$ each independently represent a hydrogen atom, an aryl group having 6 to 20 carbon atoms, or an alkyl group having 1 to 20 carbon atoms.
[2] The aromatic polycarbonate resin composition according to [1], wherein the phosphite stabilizer (B-I) having a spiro ring skeleton is represented by general formula (I) below,

[Chem. 2]

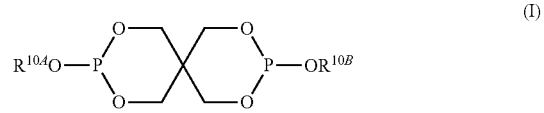

In the formula (I), $R^{10A}$ and $R^{10B}$ each independently represent an alkyl group having 1 to 30 carbon atoms or an aryl group having 6 to 30 carbon atoms.
[3] The aromatic polycarbonate resin composition according to [2], wherein the phosphite stabilizer (B-I) having a spiro ring skeleton is bis(2,6-di-tert-butyl-4-methylphenyl) pentaerythritol diphosphite.
[4] The aromatic polycarbonate resin composition according to any one of [1] to [3], wherein a mass ratio of a content of the phosphite stabilizer (B-I) and a content of the phosphite stabilizer (B-II) is phosphite stabilizer (B-I): phosphite stabilizer (B-II)=1:1 to 30, and a total content of the phosphite stabilizer (B-I) and the phosphite stabilizer (B-II) is 0.05 to 0.2 parts by mass relative to 100 parts by mass of the aromatic polycarbonate resin (A).

[5] The aromatic polycarbonate resin composition according to any one of [1] to [4], wherein a YI value at a length of 300 mm measured for a 300 mm long-optical-path molded article obtained by performing injection molding on the aromatic polycarbonate resin composition is 20 or less.

[6] A molded article obtained by molding the aromatic polycarbonate resin composition according to any one of [1] to [5].

[7] The molded article according to [6], wherein the molded article is a light guide member.

[8] The molded article according to [7], wherein the molded article is a light guide member incorporated in an automobile lighting device.

Advantageous Effects of Invention

The aromatic polycarbonate resin composition of the present invention exhibits a good hue and a good thermal discoloration-inhibiting effect without impairing the intrinsic properties of the polycarbonate resin. The aromatic polycarbonate resin composition of the present invention is suitable as a polycarbonate resin material for light guide members, and high light transfer efficiency can be achieved even for long or thick light guide members. In particular, the light guide member formed of the aromatic polycarbonate resin composition of the present invention can be suitably used as a light guide member incorporated in automobile lighting devices.

DESCRIPTION OF EMBODIMENTS

Hereafter, embodiments of the present invention will be described in detail.

[Aromatic Polycarbonate Resin Composition]

The aromatic polycarbonate resin composition comprises: 100 parts by mass of an aromatic polycarbonate resin (A); 0.001 to 0.1 parts by mass of a phosphite stabilizer (B-I) as a phosphorus-based stabilizer (B) having a spiro ring skeleton; 0.01 to 0.5 parts by mass of a phosphite stabilizer (B-II) as a phosphorus-based stabilizer (B) represented by general formula (II) below; 0.05 to 2 parts by mass of a polybutylene glycol compound (C); and 0.0005 to 0.2 parts by mass of an epoxy compound (D).

[Chem. 3]

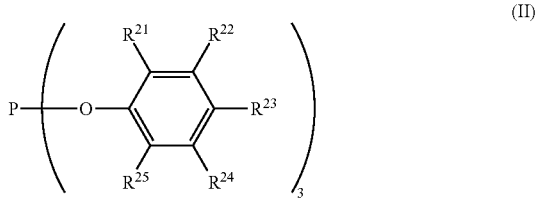

(II)

In the formula (II), $R^{21}$ to $R^{25}$ each independently represent a hydrogen atom, an aryl group having 6 to 20 carbon atoms, or an alkyl group having 1 to 20 carbon atoms.

Hereafter, the hue of a molded article immediately after molding of an aromatic polycarbonate resin composition is referred to as an "initial hue". The effect of inhibiting the yellowing of a molded article when the molded article is exposed under heating conditions for a long time is referred to as a "thermal yellowing-inhibiting effect".

<Aromatic Polycarbonate Resin (A)>

The aromatic polycarbonate resin (A) is an aromatic polycarbonate polymer obtained by reacting an aromatic hydroxy compound with phosgene or a diester of carbonic acid. The aromatic polycarbonate polymer may have a branched structure. The method for producing an aromatic polycarbonate resin is not particularly limited. The aromatic polycarbonate resin is produced by a known method such as a phosgene method (interfacial polymerization method) or a melting method (transesterification method).

Examples of the aromatic dihydroxy compound include bis(4-hydroxyphenyl)methane, 2,2-bis(4-hydroxyphenyl) propane, 2,2-bis(4-hydroxy-3-methylphenyl)propane, 2,2-bis(4-hydroxy-3-t-butylphenyl)propane, 2,2-bis(4-hydroxy-3,5-dimethylphenyl) propane, 2,2-bis(4-hydroxy-3,5-dibromophenyl)propane, 4,4-bis(4-hydroxyphenyl)heptane, 1,1-bis(4-hydroxyphenyl)cyclohexane, 4,4'-dihydroxybiphenyl, 3,3',5,5'-tetramethyl-4,4'-dihydroxybiphenyl, bis(4-hydroxyphenyl)sulfone, bis(4-hydroxyphenyl)sulfide, bis(4-hydroxyphenyl) ether, and bis(4-hydroxyphenyl) ketone.

Among the aromatic dihydroxy compounds, 2,2-bis(4-hydroxyphenyl)propane (bisphenol A) is particularly preferred.

The aromatic dihydroxy compounds may be used alone or in combination of two or more as a mixture.

In the production of the aromatic polycarbonate resin (A), for example, a polyhydric phenol intramolecularly having three or more hydroxy groups may be further added in a small amount in addition to the aromatic dihydroxy compound. In this case, the aromatic polycarbonate resin (A) has a branched structure.

Examples of the polyhydric phenol having three or more hydroxy groups include polyhydroxy compounds such as phloroglucin, 4,6-dimethyl-2,4,6-tris(4-hydroxyphenyl)heptene-2,4,6-dimethyl-2,4,6-tris(4-hydroxyphenyl)heptane, 2,6-dimethyl-2,4,6-tris(4-hydroxyphenyl)heptene-3,1,3,5-tris(4-hydroxyphenyl)benzene, and 1,1,1-tris(4-hydroxyphenyl)ethane; and 3,3-bis(4-hydroxyaryl)oxyindole (i.e., isatin bisphenol), 5-chloroisatin, 5,7-dichloroisatin, and 5-bromoisatin. In particular, 1,1,1-tris(4-hydroxyphenyl) ethane or 1,3,5-tris(4-hydroxyphenyl)benzene is preferred.

The amount of polyhydric phenol used is preferably 0.01 to 10 mol % and more preferably 0.1 to 2 mol % based on the aromatic dihydroxy compound (100 mol %).

In the polymerization performed by a transesterification method, a diester of carbonic acid is used as a monomer instead of the phosgene. Examples of the diester of carbonic acid include substituted diaryl carbonates such as diphenyl carbonate and ditolyl carbonate, and dialkyl carbonates such as dimethyl carbonate, diethyl carbonate, and di-tert-butyl carbonate. These diesters of carbonic acid may be used alone or in combination of two or more as a mixture. In particular, diphenyl carbonate and substituted diphenyl carbonate are preferred.

The diester of carbonic acid may be replaced with dicarboxylic acid or a dicarboxylic acid ester in an amount of preferably 50 mol % or less and more preferably 30 mol % or less. Examples of the dicarboxylic acid or the dicarboxylic acid ester include terephthalic acid, isophthalic acid, diphenyl terephthalate, and diphenyl isophthalate. When a part of the diester of carbonic acid is replaced with dicarboxylic acid or a dicarboxylic acid ester, polyester carbonate is obtained.

When the aromatic polycarbonate resin is produced by a transesterification method, a catalyst is normally used. The type of catalyst is not limited, but the catalyst is generally a basic compound such as an alkali metal compound, an alkaline-earth metal compound, a basic boron compound, a basic phosphorus compound, a basic ammonium compound, or an amine compound. In particular, an alkali metal compound and/or an alkaline-earth metal compound is preferred. These compounds may be used alone or in combination of two or more. In the transesterification method, the catalyst is generally deactivated using, for example, a p-toluenesulfonate.

The aromatic polycarbonate resin (A) may be copolymerized with a polymer or oligomer having a siloxane structure for the purpose of imparting flame retardancy or the like.

The aromatic polycarbonate resin (A) preferably has a viscosity-average molecular weight of 10,000 to 22,000. If the viscosity-average molecular weight of the aromatic polycarbonate resin (A) is less than 10,000, the molded article obtained has insufficient mechanical strength. Consequently, a molded article having sufficient mechanical strength sometimes cannot be obtained. If the viscosity-average molecular weight of the aromatic polycarbonate resin (A) is more than 22,000, the melt viscosity of the aromatic polycarbonate resin (A) increases. In this case, for example, when a long molded article such as a light guide member is produced by a method such as injection molding of the aromatic polycarbonate resin composition, excellent fluidity sometimes cannot be achieved. Furthermore, the amount of heat generated by shearing of the resin increases, and the resin deteriorates through thermal decomposition. As a result, a molded article having an excellent hue sometimes cannot be obtained.

The viscosity-average molecular weight of the aromatic polycarbonate resin (A) is more preferably 12,000 to 18,000 and further preferably 14,000 to 17,000.

The viscosity-average molecular weight of the aromatic polycarbonate resin (A) is determined from the solution viscosity measured at 20° C. using methylene chloride as a solvent.

The aromatic polycarbonate resin (A) may be a mixture of two or more aromatic polycarbonate resins having different viscosity-average molecular weights. The aromatic polycarbonate resin (A) may be mixed with an aromatic polycarbonate resin having a viscosity-average molecular weight outside the above range as long as the resulting viscosity-average molecular weight is within the above range.

<Phosphorus-Based Stabilizer (B)>

The aromatic polycarbonate resin composition of the present invention contains, as phosphorus-based stabilizers (B), a phosphite stabilizer (B-I) having a spiro ring skeleton (hereafter may be simply referred to as a "phosphite stabilizer (B-I)") and a phosphite stabilizer (B-II) represented by general formula (II) below (hereafter may be simply referred to as a "phosphite stabilizer (B-II)").

[Chem. 4]

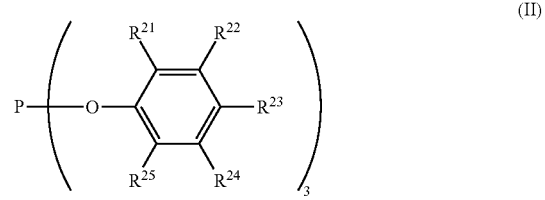

(II)

In the formula (II), $R^{21}$ to $R^{25}$ each independently represent a hydrogen atom, an aryl group having 6 to 20 carbon atoms, or an alkyl group having 1 to 20 carbon atoms.

<Phosphite Stabilizer (B-I)>

The phosphite stabilizer (B-I) may be any phosphite compound having a spiro ring skeleton. The phosphite stabilizer (B-I) is preferably represented by general formula (I) below.

[Chem. 5]

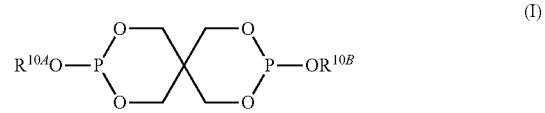

(I)

In the formula (I), $R^{10A}$ and $R^{10B}$ each independently represent an alkyl group having 1 to 30 carbon atoms or an aryl group having 6 to 30 carbon atoms.

In the general formula (I), the alkyl groups represented by $R^{10A}$ and $R^{10B}$ preferably each independently represent a linear or branched alkyl group having 1 to 10 carbon atoms. When $R^{10A}$ and $R^{10B}$ represent an aryl group, an aryl group represented by any one of general formulae (I-a), (I-b), and (I-c) below is preferred.

[Chem. 6]

(I-a)

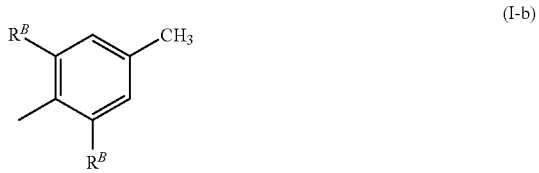

(I-b)

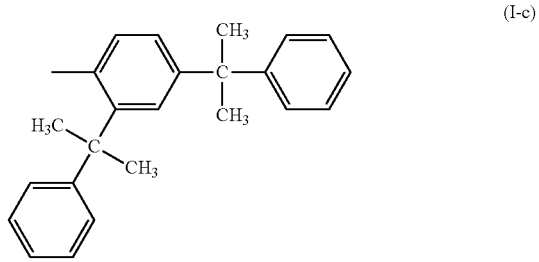

(I-c)

In the formula (I-a), $R^A$ represents an alkyl group having 1 to 10 carbon atoms. In the formula (I-b), $R^B$ represents an alkyl group having 1 to 10 carbon atoms.

The phosphite stabilizer (B-I) is preferably bis(2,6-di-tert-butyl-4-methylphenyl)pentaerythritol diphosphite represented by structural formula (I-A) below.

[Chem. 7]

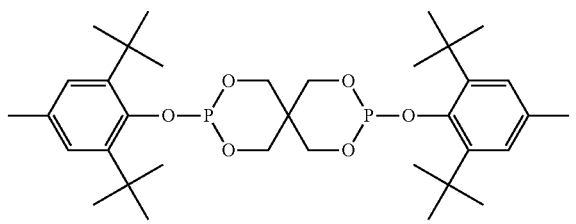

(I-A)

The phosphite stabilizers (B-I) may be used alone or in combination of two or more.

<Phosphite Stabilizer (B-II)>

The phosphite stabilizer (B-II) is represented by the general formula (II).

In the general formula (II), examples of the alkyl group represented by $R^{21}$ to $R^{25}$ include a methyl group, an ethyl group, a propyl group, a n-propyl group, a n-butyl group, a tert-butyl group, a hexyl group, and an octyl group.

The phosphite stabilizer (B-II) is particularly preferably tris(2,4-di-tert-butylphenyl) phosphite represented by structural formula (II-A) below.

[Chem. 8]

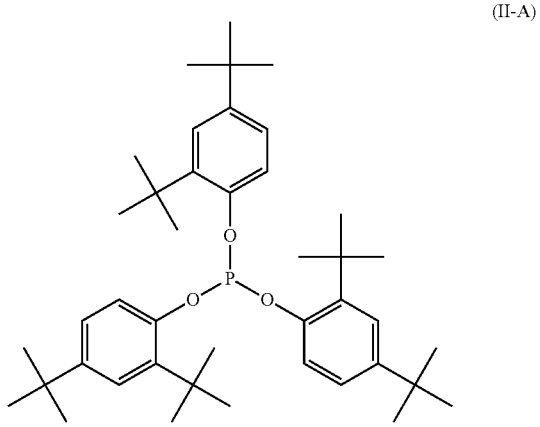

(II-A)

The phosphite stabilizers (B-II) may be used alone or in combination of two or more.

<Content of Phosphorus-Based Stabilizer (B)>

In the aromatic polycarbonate resin composition of the present invention, the content of the phosphite stabilizer (B-I) is 0.001 to 0.1 parts by mass relative to 100 parts by mass of the aromatic polycarbonate resin (A). If the content of the phosphite stabilizer (B-I) is less than 0.001 parts by mass, the thermal yellowing-inhibiting effect cannot be sufficiently produced. If the content of the phosphite stabilizer (B-I) is more than 0.1 parts by mass, the thermal yellowing-inhibiting effect tends to deteriorate, the amount of gas during molding increases, and transfer failure occurs due to mold deposits. This may reduce the light transmittance of a molded article obtained. The content of the phosphite stabilizer (B-I) is preferably 0.003 to 0.09 parts by mass, more preferably 0.005 to 0.08 parts by mass, further preferably 0.008 to 0.07 parts by mass, and particularly preferably 0.01 to 0.05 parts by mass relative to 100 parts by mass of the aromatic polycarbonate resin (A).

In the aromatic polycarbonate resin composition of the present invention, the content of the phosphite stabilizer (B-II) is 0.01 to 0.5 parts by mass relative to 100 parts by mass of the aromatic polycarbonate resin (A). If the content of the phosphite stabilizer (B-II) is less than 0.01 parts by mass, further improvements in initial hue and thermal yellowing-inhibiting effect by adding the phosphite stabilizer (B-II) cannot be sufficiently achieved. If the content of the phosphite stabilizer (B-II) is more than 0.5 parts by mass, the amount of gas during molding increases and transfer failure occurs due to mold deposits. This may reduce the light transmittance of a molded article obtained. The content of the phosphite stabilizer (B-II) is preferably 0.03 to 0.3 parts by mass and more preferably 0.05 to 0.2 parts by mass relative to 100 parts by mass of the aromatic polycarbonate resin (A).

To more effectively produce the combined effect of the phosphite stabilizer (B-I) and the phosphite stabilizer (B-II), the mass ratio of the content of the phosphite stabilizer (B-I) and the content of the phosphite stabilizer (B-II) in the aromatic polycarbonate resin composition of the present invention is preferably 1:1 to 30, more preferably 1:1 to 20, further preferably 1:1 to 15, particularly preferably 1:2 to 10, and especially preferably 1:3 to 7.

The total content of the phosphite stabilizer (B-I) and the phosphite stabilizer (B-II) in the aromatic polycarbonate resin composition of the present invention is preferably 0.05 to 0.2 parts by mass and more preferably 0.1 to 0.15 parts by mass relative to 100 parts by mass of the aromatic polycarbonate resin (A).

<Polybutylene Glycol Compound (C)>

The polybutylene glycol compound (C) used in the present invention is a branched glycol compound represented by general formula (III) below.

[Chem. 9]

$$X\text{—}O\text{-}(\text{CHR}\text{—}CH_2\text{—}O\text{-})_n Y \qquad (III)$$

In the formula (III), R represents an ethyl group; X and Y each independently represent a hydrogen atom, an aliphatic acyl group having 1 to 23 carbon atoms, or an alkyl group having 1 to 23 carbon atoms; and n represents an integer of 10 to 400.

In the general formula (III), the integer (degree of polymerization) n is 10 to 400, preferably 15 to 200, and more preferably 20 to 100. If the degree of polymerization n is less than 10, the amount of gas generated during molding increases, which may cause molding failure due to gas, such as incomplete filling, gas burning, or transfer failure. If the degree of polymerization n is more than 400, the hue of the aromatic polycarbonate resin composition sometimes cannot be sufficiently improved.

The branched polybutylene glycol compound is preferably a polybutylene glycol with X and Y representing a hydrogen atom in the general formula (III).

Even if one end or both ends of the polybutylene glycol compound (C) are blocked with a fatty acid or an alcohol, no influence is exerted on the performance of the polybutylene glycol compound (C). An esterified product with a fatty acid or an etherified product may also be used as the polybutylene glycol compound (C) in the same manner. Therefore, X and/or Y in the general formula (III) may represent an aliphatic acyl group or alkyl group having 1 to 23 carbon atoms.

The esterified product with a fatty acid may be a linear or branched fatty acid ester. The fatty acid for the fatty acid ester may be a saturated fatty acid or an unsaturated fatty acid. Furthermore, some hydrogen atoms may be substituted with a substituent such as a hydroxy group.

The fatty acid for the fatty acid ester is a monovalent or divalent fatty acid having 1 to 23 carbon atoms. Specific examples of the monovalent saturated fatty acid include formic acid, acetic acid, propionic acid, butyric acid, valeric acid, caproic acid, enanthic acid, caprylic acid, capric acid, lauric acid, myristic acid, pentadecylic acid, palmitic acid, heptadecylic acid, stearic acid, nonadecanoic acid, arachidic acid, and behenic acid. Specific examples of the monovalent unsaturated fatty acid include oleic acid, elaidic acid, linoleic acid, linolenic acid, and arachidonic acid. Specific examples of the divalent fatty acid having 10 or more carbon atoms include sebacic acid, undecanedioic acid, dodecanedioic acid, tetradecanedioic acid, thapsic acid, decenedioic acid, undecenedioic acid, and dodecenedioic acid.

These fatty acids may be used alone or in combination of two or more. The fatty acid may be a fatty acid intramolecularly having one or more hydroxy groups.

Specifically, the fatty acid ester of polybutylene glycol is preferably a polybutylene glycol stearate with X and Y representing an aliphatic acyl group having 18 carbon atoms in the general formula (III) or a polybutylene glycol behenate with X and Y representing an aliphatic acyl group having 22 carbon atoms in the general formula (III).

The alkyl group for the polybutylene glycol alkyl ether may have a linear or branched structure. Examples of the alkyl group include alkyl groups having 1 to 23 carbon atoms, such as a methyl group, an ethyl group, a propyl group, a butyl group, an octyl group, a lauryl group, and a stearyl group. The polybutylene glycol compound (C) is preferably, for example, polybutylene glycol methyl ether, polybutylene glycol ethyl ether, polybutylene glycol butyl ether, polybutylene glycol lauryl ether, or polybutylene glycol stearyl ether.

The polybutylene glycol compound (C) preferably has a number-average molecular weight of 200 to 5,000. The number-average molecular weight of the polybutylene glycol compound (C) is more preferably 300 or more, more preferably 500 or more, more preferably 4,000 or less, more preferably 3,000 or less, particularly preferably 2000 or less, especially preferably less than 1000, and most preferably 800 or less. It is not preferable that the number-average molecular weight exceed the above upper limit because the compatibility deteriorates. It is not preferable that the number-average molecular weight fall below the above lower limit because gas is generated during molding.

The number-average molecular weight of the polybutylene glycol compound (C) is a number-average molecular weight calculated on the basis of the hydroxyl value measured in conformity with JIS K1577.

As the number-average molecular weight of the polybutylene glycol compound (C) decreases, the mold fouling (mold deposits) during molding is suppressed.

The polybutylene glycol compounds (C) may be used alone or in combination of two or more.

In the aromatic polycarbonate resin composition of the present invention, the content of the polybutylene glycol compound (C) is 0.05 to 2 parts by mass relative to 100 parts by mass of the aromatic polycarbonate resin (A). If the content of the polybutylene glycol compound (C) is less than 0.05 parts by mass or more than 2 parts by mass, the initial hue of a molded article obtained tends to deteriorate. The content of the polybutylene glycol compound (C) is preferably 0.1 to 1.5 parts by mass, more preferably 0.2 to 1.2 parts by mass, and further preferably more than 0.5 parts by mass and 1.0 part by mass or less relative to 100 parts by mass of the aromatic polycarbonate resin (A).

[Epoxy Compound (D)]

The epoxy compound (D) is a compound having one or more epoxy groups in one molecule. Specific preferred examples of the compound include phenyl glycidyl ether, allyl glycidyl ether, t-butylphenyl glycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethylene oxide, cyclohexylmethyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, diglycidyl phthalate, diglycidyl hexahydrophthalate, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-t-butyl-4,5-epoxytetrahydrophthalic anhydride, diethyl-4,5-epoxy-cis-1,2-cyclohexyl dicarboxylate, di-n-butyl-3-t-butyl-4,5-epoxy-cis-1,2-cyclohexyl dicarboxylate, epoxidized soybean oil, and epoxidized linseed oil. In particular, an alicyclic epoxy compound having two or more epoxy groups in one molecule is preferred.

The epoxy compounds (D) may be used alone or in combination of two or more.

In the aromatic polycarbonate resin composition of the present invention, the content of the epoxy compound (D) is 0.0005 to 0.2 parts by mass relative to 100 parts by mass of the polycarbonate resin (A). The content of the epoxy compound (D) is preferably 0.001 parts by mass or more, more preferably 0.003 parts by mass or more, further preferably 0.005 parts by mass or more, particularly preferably 0.01 parts by mass or more, and especially preferably 0.03 parts by mass or more and is preferably 0.15 parts by mass or less, more preferably 0.1 parts by mass or less, and further preferably 0.05 parts by mass or less. If the content of the epoxy compound (D) is less than 0.0005 parts by mass, the hue and the thermal discoloration-inhibiting effect are not sufficiently provided. If the content of the epoxy compound (D) is more than 0.2 parts by mass, the thermal discoloration-inhibiting effect further deteriorates and furthermore the hue and the hygrothermal stability deteriorate.

<Other Components>

The aromatic polycarbonate resin composition of the present invention may further optionally contain, for example, an antioxidant, a release agent, an ultraviolet absorber, a fluorescent brightening agent, a dye, a pigment, a flame retardant, an impact modifier, an antistatic agent, a lubricant, a plasticizer, a compatibilizer, and a filler as long as the object of the present invention is achieved.

<Method for Producing Aromatic Polycarbonate Resin Composition>

The method for producing an aromatic polycarbonate resin composition according to the present invention is not particularly limited. An example of the method is a method in which each component is added all together or separately and melt-kneaded at any stage before completion of a final molded article. Each component is added by, for example, a method that uses a tumbler or a Henschel mixer or a method in which each component is quantitatively fed to an extruder hopper with a feeder and mixed. The melt-kneading is performed using, for example, a uniaxial kneading extruder, a biaxial kneading extruder, a kneader, or a Banbury mixer.

[Molded Article]

The molded article of the present invention is obtained by molding the aromatic polycarbonate resin composition of the present invention.

The aromatic polycarbonate resin composition of the present invention is molded by any method such as an injection molding method, a compression molding method, or an injection compression molding method. An injection molding method is preferred.

To suppress heat deterioration of a resin during molding and achieve an excellent initial hue, the aromatic polycarbonate resin composition of the present invention is preferably molded in an atmosphere of inert gas such as nitrogen.

The molded article of the present invention obtained by molding the aromatic polycarbonate resin composition of the present invention has a smaller degree of yellowing caused when exposed under heating conditions for a long time and a better initial hue than known molded articles. Therefore, the molded article of the present invention can be suitably used as a light guide member for lighting devices, in particular, a light guide member for automobile lighting devices that is exposed under heating conditions by not only heat generated from light sources of daytime running lights but also heat generated from incandescent lamps. According to the present invention, the light guide member has a high light transfer efficiency maintained for a long time because of its excellent initial hue and thermal discoloration-inhibiting effect, which can considerably reduce the frequency of replacing the light guide member.

[YI Value]

The aromatic polycarbonate resin composition of the present invention is excellent in terms of initial hue. The YI value at a length of 300 mm measured for a 300 mm long-optical-path molded article obtained by performing injection molding on the aromatic polycarbonate resin composition of the present invention in conformity with a method described in Examples below is normally 20 or less, preferably 16 or less, and more preferably 14 or less. Thus, the molded article exhibits a much better hue than known molded articles.

EXAMPLES

Hereafter, the present invention will be more specifically described based on Examples, though such Examples are not intended to limit the present invention without departing from the scope of the present invention.

The materials used in Examples and Comparative Examples are as follows.

<Aromatic Polycarbonate Resin (A)>

"Iupilon (registered trademark) H-4000N" manufactured by Mitsubishi Engineering-Plastics Corporation: bisphenol A aromatic polycarbonate resin (viscosity-average molecular weight 16,000) manufactured by an interfacial polymerization method <Phosphorus-Based Stabilizer (B)>
<Phosphite Stabilizer (B-I)>

"ADK STAB PEP-36" manufactured by ADEKA Corporation: bis(2,6-di-tert-butyl-4-methylphenyl)pentaerythritol diphosphite represented by the structural formula (I-A) (given as "PEP-36" in Tables 1 to 5)

<Phosphite Stabilizer (B-II)>

"ADK STAB AS2112" manufactured by ADEKA Corporation: tris(2,4-di-tert-butylphenyl) phosphite represented by the structural formula (II-A) (given as "AS2112" in Tables 1 to 5)

<Polybutylene Glycol Compound (C)>

"UNIOL PB-700" manufactured by NOF Corporation: polybutylene glycol (number-average molecular weight 700) (given as "PB-700" in Tables 1, 2, and 5)

"UNIOL PB-500" manufactured by NOF Corporation: polybutylene glycol (number-average molecular weight 500) (given as "PB-500" in Tables 3 and 5)

<Epoxy Compound (D)>

"Celloxide 2021P" manufactured by Daicel Corporation: 3,4-epoxycyclohexylmethyl-3',4'-epoxycyclohexyl carboxylate (given as "2021P" in Tables 1 to 5)

<Polypropylene Glycol>

"UNIOL D-1000" manufactured by NOF Corporation: polypropylene glycol (number-average molecular weight 1,000) (given as "D-1000" in Table 4)

<Fatty Acid Ester>

"RIKEMAL S-100A" manufactured by RIKEN VITAMIN Co., Ltd.: stearic acid monoglyceride (given as "S-100A" in Table 4)

<Release Agent>

"SH556" manufactured by Dow Corning Toray Co., Ltd.: methylphenylpolysiloxane (given as "SH556" in Table 4)

Examples 1 to 33 and Comparative Examples 1 to 24

<Production of Aromatic Polycarbonate Resin Composition>

Components listed in Tables 1 to 5 were added at ratios listed in Tables 1 to 5 and uniformly mixed using a tumbler mixer to prepare a mixture. The resulting mixture was fed to a uniaxial extruder ("VS-40" manufactured by Isuzu Kakoki Co., Ltd.) equipped with a full flight screw and a vent, kneaded at a screw rotational speed of 80 rpm at a discharge rate of 20 kg/h at a barrel temperature of 250° C., and extruded into a strand from the tip of an extruder nozzle. The extruded product was rapidly cooled in a water tank and cut into pellets using a pelletizer. Thus, pellets of the aromatic polycarbonate resin composition were obtained.

The following evaluations were performed on the obtained aromatic polycarbonate resin composition. Tables 1 to 5 show the results.

<Evaluation of Initial Hue (YI)>

The pellets of the aromatic polycarbonate resin composition were dried using a hot-air circulating dryer at 120° C. for 4 to 8 hours and then molded at 280° C. using an injection molding machine ("EC100" manufactured by TOSHIBA MACHINE Co., Ltd.) to obtain a 300 mm long-optical-path molded article (6 mm×4 mm×300 mm, L/d=50). The YI value of this molded article at a length of 300 mm was measured using a long pathlength transmission spectrophotometer ("ASA1" manufactured by Nippon Denshoku Industries Co., Ltd.).

<Evaluation of Thermal Discoloration Resistance ($\Delta YI_1$)>

After the long-optical-path molded article obtained in the evaluation of the initial hue (YI) was held at 120° C. for 1000 hours, YI was measured at an optical path length of 300 mm (posttreatment YI). The difference in YI value ($\Delta YI_1$=posttreatment YI−initial YI) was determined to evaluate the thermal discoloration resistance ($\Delta YI_1$).

<Evaluation of Retention Discoloration Resistance ($\Delta YI_2$)>

A 300 mm optical-path-length molded article was obtained in the same manner as in the evaluation of the initial hue (YI), except that the pellets were retained in the injection molding machine at 280° C. for 25 minutes and then subjected to injection molding. Similarly, YI was measured at an optical path length of 300 mm (postretention YI). The difference in YI value ($\Delta YI_2$=postretention YI−initial YI) was determined to evaluate the retention discoloration resistance ($\Delta YI_2$).

TABLE 1

| | | | Comparative Example 1 | Example 1 | Comparative Example 2 | Example 2 | Example 3 | Example 4 | Comparative Example 3 | Example 5 |
|---|---|---|---|---|---|---|---|---|---|---|
| Aromatic polycarbonate resin composition (parts by mass) | Aromatic polycarbonate resin (A) | | 100 | 100 | 100 | 100 | 100 | 100 | 100 | 100 |
| | Phosphorus-based stabilizer (B) | (B-I): PEP-36 | 0.02 | 0.02 | 0.02 | 0.02 | 0.02 | 0.02 | 0.02 | 0.02 |
| | | (B-II): AS2112 | 0.1 | 0.1 | 0.1 | 0.1 | 0.1 | 0.1 | 0.1 | 0.1 |
| | Polybutylene glycol compound (C) | PB-700 | 0.25 | 0.25 | 0.5 | 0.5 | 0.5 | 0.5 | 0.6 | 0.6 |
| | Epoxy compound (D) | 2021P | — | 0.01 | — | 0.01 | 0.05 | 0.10 | — | 0.01 |
| (B-I):(B-II) mass ratio | | | 1:5 | 1:5 | 1:5 | 1:5 | 1:5 | 1:5 | 1:5 | 1:5 |
| Initial hue (YI) | | | 13 | 13 | 12 | 12 | 12 | 12 | 12 | 12 |
| Thermal discoloration resistance ($\Delta YI_1$) | | | 27 | 25 | 32 | 30 | 27 | 26 | 34 | 31 |
| Retention discoloration resistance ($\Delta YI_2$) | | | 0.5 | 0.5 | 0.5 | 0.5 | 0.4 | 0.4 | 0.5 | 0.5 |

| | | | Example 6 | Example 7 | Example 8 | Example 9 | Example 10 | Comparative Example 4 | Comparative Example 5 | Comparative Example 6 |
|---|---|---|---|---|---|---|---|---|---|---|
| Aromatic polycarbonate resin composition (parts by mass) | Aromatic polycarbonate resin (A) | | 100 | 100 | 100 | 100 | 100 | 100 | 100 | 100 |
| | Phosphorus-based stabilizer (B) | (B-I): PEP-36 | 0.02 | 0.02 | 0.01 | 0.035 | 0.05 | 0.05 | — | — |
| | | (B-II): AS2112 | 0.1 | 0.1 | 0.1 | 0.1 | 0.1 | 0.1 | 0.1 | — |
| | Polybutylene glycol compound (C) | PB-700 | 0.6 | 0.6 | 0.6 | 0.6 | 0.6 | 0.6 | 0.6 | 0.6 |
| | Epoxy compound (D) | 2021P | 0.05 | 0.10 | 0.10 | 0.10 | 0.10 | — | 0.10 | 0.10 |
| (B-I):(B-II) mass ratio | | | 1:5 | 1:5 | 1:10 | 1:2.8 | 1:2 | 1:2 | — | — |
| Initial hue (YI) | | | 12 | 12 | 12 | 12 | 12 | 12 | 12 | 23 |
| Thermal discoloration resistance ($\Delta YI_1$) | | | 27 | 26 | 28 | 31 | 33 | 36 | 35 | — |
| Retention discoloration resistance ($\Delta YI_2$) | | | 0.4 | 0.4 | 0.4 | 0.4 | 0.4 | 0.4 | 0.4 | — |

TABLE 2

| | | | Comparative Example 7 | Example 11 | Example 12 | Example 13 | Example 14 | Example 15 | Comparative Example 8 | Example 16 |
|---|---|---|---|---|---|---|---|---|---|---|
| Aromatic polycarbonate resin composition (parts by mass) | Aromatic polycarbonate resin (A) | | 100 | 100 | 100 | 100 | 100 | 100 | 100 | 100 |
| | Phosphorus-based stabilizer (B) | (B-I): PEP-36 | 0.02 | 0.02 | 0.02 | 0.02 | 0.01 | 0.05 | 0.02 | 0.02 |
| | | (B-II): AS2112 | 0.1 | 0.1 | 0.1 | 0.1 | 0.1 | 0.1 | 0.1 | 0.1 |

TABLE 2-continued

| | | | | | | | | | | |
|---|---|---|---|---|---|---|---|---|---|---|
| Polybutylene glycol compound (C) | PB-700 | 0.8 | 0.8 | 0.8 | 0.8 | 0.8 | 0.8 | 1.0 | 1.0 |
| Epoxy compound (D) | 2021P | — | 0.01 | 0.05 | 0.10 | 0.10 | 0.10 | — | 0.01 |
| (B-I):(B-II) mass ratio | | 1:5 | 1:5 | 1:5 | 1:5 | 1:10 | 1:2 | 1:5 | 1:5 |
| Initial hue (YI) | | 12 | 12 | 12 | 12 | 12 | 12 | 13 | 13 |
| Thermal discoloration resistance ($\Delta YI_1$) | | 36 | 33 | 29 | 28 | 30 | 35 | 38 | 35 |
| Retention discoloration resistance ($\Delta YI_2$) | | 0.5 | 0.5 | 0.4 | 0.4 | 0.4 | 0.4 | 0.5 | 0.5 |

| | | | | Example 17 | Example 18 | Example 19 | Example 20 |
|---|---|---|---|---|---|---|---|
| Aromatic polycarbonate resin composition (parts by mass) | Aromatic polycarbonate resin (A) | | | 100 | 100 | 100 | 100 |
| | Phosphorus-based stabilizer (B) | (B-I): | PEP-36 | 0.02 | 0.02 | 0.01 | 0.05 |
| | | (B-II): | AS2112 | 0.1 | 0.1 | 0.1 | 0.1 |
| | Polybutylene glycol compound (C) | PB-700 | | 1.0 | 1.0 | 1.0 | 1.0 |
| | Epoxy compound (D) | 2021P | | 0.05 | 0.10 | 0.10 | 0.10 |
| (B-I):(B-II) mass ratio | | | | 1:5 | 1:5 | 1:10 | 1:2 |
| Initial hue (YI) | | | | 13 | 13 | 13 | 13 |
| Thermal discoloration resistance ($\Delta YI_1$) | | | | 31 | 30 | 32 | 37 |
| Retention discoloration resistance ($\Delta YI_2$) | | | | 0.4 | 0.4 | 0.4 | 0.4 |

TABLE 3

| | | | Comparative Example 9 | Example 21 | Example 22 | Example 23 | Comparative Example 10 | Example 24 | Example 25 | Example 26 |
|---|---|---|---|---|---|---|---|---|---|---|
| Aromatic polycarbonate resin composition (parts by mass) | Aromatic polycarbonate resin (A) | | 100 | 100 | 100 | 100 | 100 | 100 | 100 | 100 |
| | Phosphorus-based stabilizer (B) | (B-I): PEP-36 | 0.02 | 0.02 | 0.02 | 0.02 | 0.02 | 0.02 | 0.02 | 0.02 |
| | | (B-II): AS2112 | 0.1 | 0.1 | 0.1 | 0.1 | 0.1 | 0.1 | 0.1 | 0.1 |
| | Polybutylene glycol compound (C) | PB-500 | 0.6 | 0.6 | 0.6 | 0.6 | 0.8 | 0.8 | 0.8 | 0.8 |
| | Epoxy compound (D) | 2021P | — | 0.01 | 0.05 | 0.10 | — | 0.01 | 0.05 | 0.10 |
| (B-I):(B-II) mass ratio | | | 1:5 | 1:5 | 1:5 | 1:5 | 1:5 | 1:5 | 1:5 | 1:5 |
| Initial hue (YI) | | | 12 | 12 | 12 | 12 | 12 | 12 | 12 | 12 |
| Thermal discoloration resistance ($\Delta YI_1$) | | | 32 | 30 | 26 | 25 | 34 | 32 | 28 | 27 |
| Retention discoloration resistance ($\Delta YI_2$) | | | 0.5 | 0.5 | 0.4 | 0.4 | 0.5 | 0.5 | 0.4 | 0.4 |

| | | | Comparative Example 11 | Example 27 | Example 28 | Example 29 |
|---|---|---|---|---|---|---|
| | Aromatic polycarbonate resin composition (parts by mass) | Aromatic polycarbonate resin (A) | 100 | 100 | 100 | 100 |
| | | Phosphorus-based stabilizer (B) (B-I): PEP-36 | 0.02 | 0.02 | 0.02 | 0.02 |
| | | (B-II): AS2112 | 0.1 | 0.1 | 0.1 | 0.1 |

TABLE 3-continued

|  |  |  |  |  |  |  |
|---|---|---|---|---|---|---|
|  | Polybutylene glycol compound (C) | PB-500 | 1.0 | 1.0 | 1.0 | 1.0 |
|  | Epoxy compound (D) | 2021P | — | 0.01 | 0.05 | 0.10 |
|  | (B-I):(B-II) mass ratio |  | 1:5 | 1:5 | 1:5 | 1:5 |
|  | Initial hue (YI) |  | 12 | 12 | 12 | 12 |
|  | Thermal discoloration resistance ($\Delta YI_1$) |  | 37 | 34 | 30 | 29 |
|  | Retention discoloration resistance ($\Delta YI_2$) |  | 0.5 | 0.5 | 0.4 | 0.4 |

TABLE 4

|  |  |  | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|---|
| Aromatic polycarbonate resin composition (parts by mass) | Aromatic polycarbonate resin (A) |  | 100 | 100 | 100 | 100 | 100 | 100 | 100 | 100 | 100 |
|  | Phosphorus-based stabilizer (B) | (B-I): PEP-36 | 0.02 | 0.02 | 0.02 | 0.05 | 0.05 | 0.05 | 0.05 | 0.05 | 0.02 |
|  |  | (B-II): AS2112 | 0.1 | 0.1 | 0.1 | 0.1 | 0.1 | — | 0.1 | — | 0.1 |
|  | Polybutylene glycol | D-1000 | 0.5 | 0.8 | 1.0 | 0.5 | 1.0 | — | — | — | — |
|  | Epoxy compound (D) | 2021P | 0.10 | 0.10 | 0.10 | — | — | — | — | — | — |
|  | Fatty acid ester | S-100A | — | — | — | — | — | 0.1 | 0.1 | — | 0.1 |
|  | Release agent | SH556 | — | — | — | — | — | — | — | 0.04 | — |
| (B-I):(B-II) mass ratio |  |  | 1:5 | 1:5 | 1:5 | 1:2 | 1:2 | — | 1:2 | — | 1:5 |
| Initial hue (YI) |  |  | 14 | 15 | 15 | 14 | 15 | 21 | 21 | 28 | 21 |
| Thermal discoloration resistance ($\Delta YI_1$) |  |  | 31 | 34 | 36 | 40 | 46 | — | — | — | — |
| Retention discoloration resistance ($\Delta YI_2$) |  |  | — | — | — | — | — | — | — | — | — |

TABLE 5

|  |  |  | Example 30 | Example 31 | Example 32 | Example 33 | Comparative Example 21 | Comparative Example 22 | Comparative Example 23 | Comparative Example 24 |
|---|---|---|---|---|---|---|---|---|---|---|
| Aromatic polycarbonate resin composition (parts by mass) | Aromatic polycarbonate resin (A) |  | 100 | 100 | 100 | 100 | 100 | 100 | 100 | 100 |
|  | Phosphorus-based stabilizer (B) | (B-I): PEP-36 | 0.004 | 0.004 | 0.004 | 0.004 | — | — | — | — |
|  |  | (B-II): AS2112 | 0.1 | 0.1 | 0.1 | 0.1 | 0.1 | 0.1 | 0.1 | 0.1 |
|  | Polybutylene glycol compound (C) | PB-700 | 0.6 | 0.8 | — | — | 0.6 | 0.8 | — | — |
|  |  | PB-500 | — | — | 0.6 | 0.8 | — | — | 0.6 | 0.8 |
|  | Epoxy compound (D) | 2021P | 0.05 | 0.05 | 0.05 | 0.05 | 0.05 | 0.05 | 0.05 | 0.05 |
| (B-I):(B-II) mass ratio |  |  | 1:25 | 1:25 | 1:25 | 1:25 | — | — | — | — |
| Initial hue (YI) |  |  | 12 | 12 | 12 | 12 | 12 | 12 | 12 | 12 |
| Thermal discoloration resistance ($\Delta YI_1$) |  |  | 29 | 31 | 28 | 30 | 36 | 37 | 34 | 35 |
| Retention discoloration resistance ($\Delta YI_2$) |  |  | 0.4 | 0.4 | 0.4 | 0.4 | 0.4 | 0.4 | 0.4 | 0.4 |

The following is understood from Tables 1 to 5.

When the composition contains a particular phosphite stabilizer (B-I) and a particular phosphite stabilizer (B-II) serving as phosphorus-based stabilizers (B), a polybutylene glycol compound (C), and an epoxy compound (D), an excellent initial hue is achieved and the thermal discoloration resistance and the retention discoloration resistance are improved (Examples 1 to 33).

In Comparative Examples 1 to 4 and 7 to 11 in which the epoxy compound (D) is not added, the thermal discoloration resistance is poor.

In Comparative Examples 12 to 14 in which polypropylene glycol is used instead of the polybutylene glycol compound (C) and Comparative Examples 15 and 16 in which polypropylene glycol is used instead of the polybutylene glycol compound (C) and the epoxy compound (D) is not added, the thermal discoloration resistance is poor.

In Comparative Example 6 in which the phosphorus-based stabilizer (B) is not added, the initial hue is poor.

In Comparative Example 5 and Comparative Examples 21 to 24 in which only the phosphite stabilizer (B-II) is used as the phosphorus-based stabilizer (B), the thermal discoloration resistance is poor.

In Comparative Examples 17 to 20 in which the polybutylene glycol compound (C) and the epoxy compound (D) are not added, the initial hue is poor.

The present invention has been described in detail based on specific embodiments. However, it is obvious for those skilled in the art that various modifications can be made without departing from the intention and scope of the present invention.

The present application is based on Japanese Patent Application No. 2015-231998 filed on Nov. 27, 2015 and Japanese Patent Application No. 2016-175695 filed on Sep. 8, 2016, the entire contents of which are incorporated herein by reference.

The invention claimed is:

1. An aromatic polycarbonate resin composition consisting of:
   100 parts by mass of an aromatic polycarbonate resin (A);
   0.001 to 0.1 parts by mass of a phosphite stabilizer (B-I) having a Spiro ring skeleton;
   0.03 to 0.3 parts by mass of a phosphite stabilizer (B-II) represented by formula (II);
   0.05 to 2 parts by mass of a polybutylene glycol compound (C) having a number average molecular weight of 200 to 800; and
   0.0005 to 0.2 parts by mass of an epoxy compound (D),

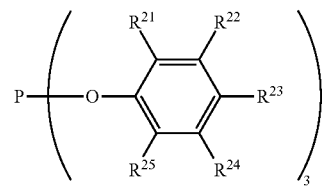

(II)

where $R^{21}$ to $R^{25}$ each independently represent a hydrogen atom, an aryl group having 6 to 20 carbon atoms, or an alkyl group having 1 to 20 carbon atoms, wherein the phosphite stabilizer (B-I) having a spiro ring skeleton is bis(2,6-di-tert-butyl-4-methylphenyl)pentaerythritol diphosphate, and wherein a mass ratio of a content of the phosphite stabilizer (B-I) and a content of the phosphite stabilizer (B-II) is phosphite stabilizer (B-I):phosphite stabilizer (B-II) within a range of 1:1 to 1:30.

2. The aromatic polycarbonate resin composition according to claim 1, wherein a total content of the phosphite stabilizer (B-I) and the phosphite stabilizer (B-II) is 0.05 to 0.2 parts by mass relative to 100 parts by mass of the aromatic polycarbonate resin (A).

3. The aromatic polycarbonate resin composition according to claim 1, wherein a YI value at a length of 300 mm measured for a 300 mm long-optical-path molded article obtained by performing injection molding on the aromatic polycarbonate resin composition is 20 or less.

4. A molded article obtained by molding the aromatic polycarbonate resin composition according to claim 1.

5. The molded article according to claim 4, wherein the molded article is a light guide member.

6. The molded article according to claim 5, wherein the molded article is a light guide member incorporated in an automobile lighting device.

7. The aromatic polycarbonate resin composition according to claim 1, comprising 0.005 to 0.1 parts by mass of the phosphite stabilizer (B-I) having a spiro ring skeleton.

8. The aromatic polycarbonate resin composition according to claim 1, wherein a mass ratio of a content of the phosphite stabilizer (B-I) and a content of the phosphite stabilizer (B-II) is phosphite stabilizer (B-I):phosphite stabilizer (B-II) within a range of 1:1 to 1:15, and a total content of the phosphite stabilizer (B-I) and the phosphite stabilizer (B-II) is 0.05 to 0.2 parts by mass relative to 100 parts by mass of the aromatic polycarbonate resin (A).

* * * * *